Mar. 13, 1923.
P. S. LARSON.
AUTO FRAME.
FILED APR. 17, 1922.
1,448,133.
2 SHEETS—SHEET 2.
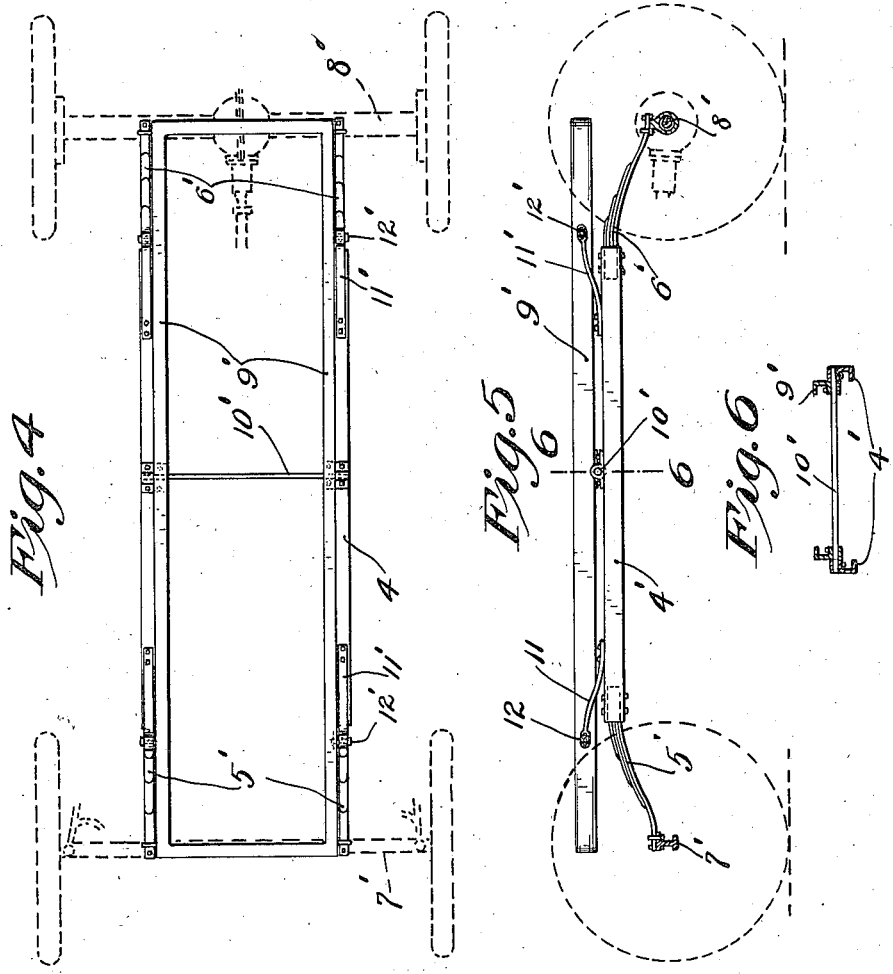

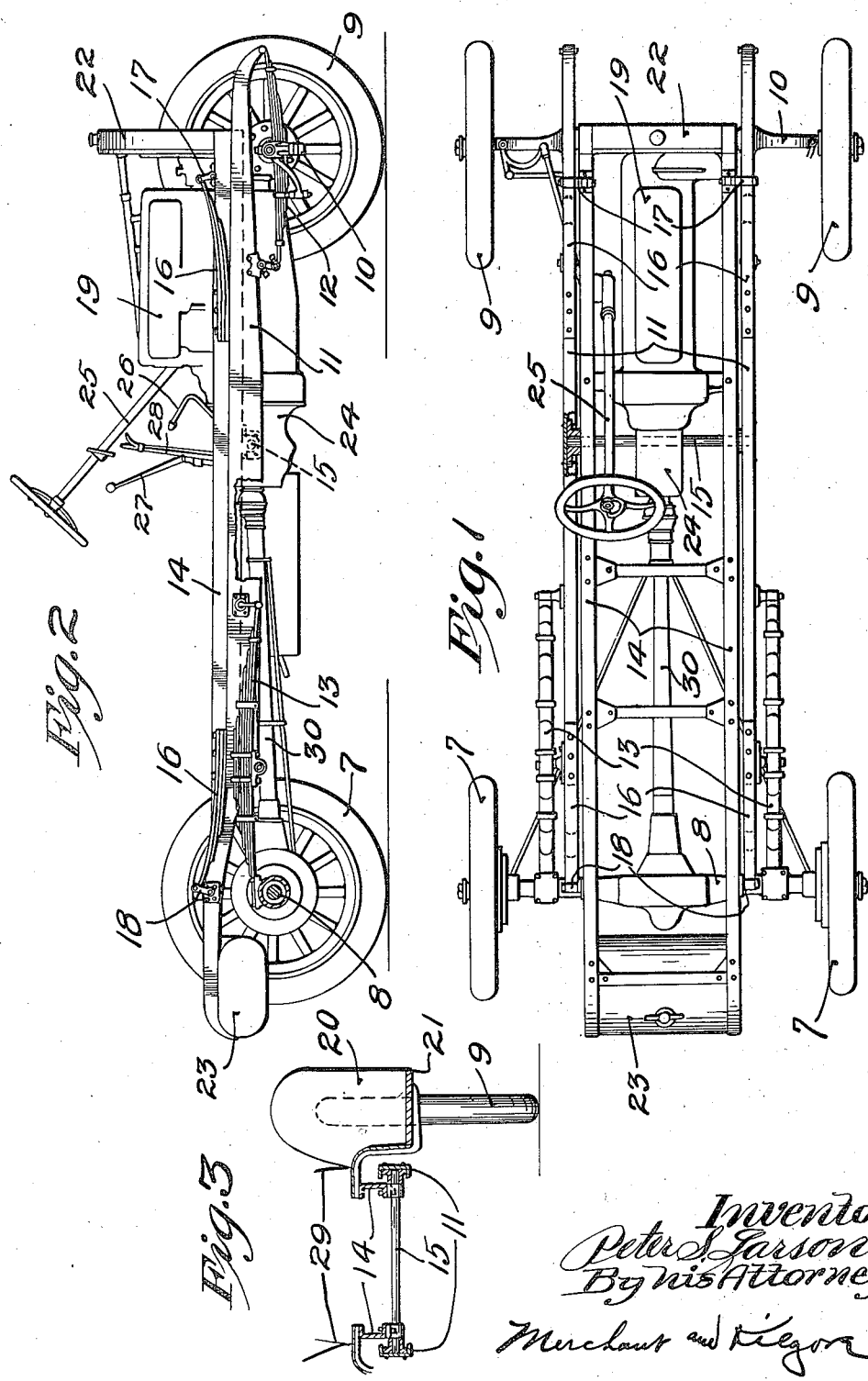

Patented Mar. 13, 1923.

1,448,133

UNITED STATES PATENT OFFICE.

PETER S. LARSON, OF MINNEAPOLIS, MINNESOTA.

AUTO FRAME.

Application filed April 17, 1922. Serial No. 554,142.

*To all whom it may concern:*

Be it known that I, PETER S. LARSON, a citizen of the United States, residing at Minneapolis, in the county of Hennepin and State of Minnesota, have invented certain new and useful Improvements in Auto Frames; and I do hereby declare the following to be a full, clear, and exact description of the invention, such as will enable others skilled in the art to which it appertains to make and use the same.

My present invention relates to frame and body structure for automobiles and is in the nature of an improvement on or refinement of the structure disclosed and broadly claimed in my prior Patent 1,275,272 of date August 13, 1918.

In my said prior patent, as a salient feature of the invention, there is disclosed and broadly claimed in combination with a spring-supported main frame, a vehicle body intermediately pivoted to a spring mounted on said main frame, and thereby so arranged that shocks due to irregular roads will be reduced to a minimum. All is more fully disclosed in my prior patent. The said prior patent did not specifically disclose nor specifically claim any particular arrangement or disposition either of the engine nor of the fenders in respect to either the main frame nor of the body or pivoted secondary frame to which the body was directly secured.

The present invention is directed primarily to the arrangement broadly claimed in my prior patent, but in which both the engine and the fenders are carried on the pivoted secondary frame or body member. The invention, however, also involves some very important features that will hereinafter appear.

The invention is illustrated in the accompanying drawings wherein like characters indicate like parts throughout the several views.

Referring to the drawings:

Fig. 1 is a plan view showing an automobile chassis with the fenders removed to better show the other features of construction;

Fig. 2 is a side elevation of the parts shown in Fig. 1;

Fig. 3 is a transverse section with some parts removed and some parts broken away, but showing the manner in which the fenders and running boards are carried from the pivoted secondary frame and are thus secured in respect to the automobile body;

Fig. 4 is a fragmentary plan view illustrating a slightly modified construction;

Fig. 5 is a side elevation of the parts shown in Fig. 4; and

Fig. 6 is a section on the line 6—6 of Fig. 5.

Referring first to the construction illustrated in Figs. 1, 2 and 3, the numeral 7 indicates the rear traction wheels, the numeral 8 the rear axle casing, the numeral 9 the front wheels, the numeral 10 the front axle, the numeral 11 the main frame, the numeral 12 the front semi-elliptical springs and the numeral 13 semi-elliptical cantilever rear springs, which parts so far described may be assumed to be of standard automobile construction, capable of variance in accordance with well known automobile practice.

In the standard automobile construction the engine, the automobile body, and the fenders would all be mounted on said main frame 11. In accordance with my invention, however, a secondary frame 14, which will constitute the part of the automobile body or to which the automobile body will be directly secured, is intermediately pivoted to the main frame 11 by a cross pivot shaft 15. This intermediately pivoted secondary or auxiliary frame, as shown, is of such width that it comes between the side beams of the main frame, and at its front and rear ends it is connected to the main frame by secondary or auxiliary springs. As shown, these springs 16 are of the cantilever type, the front members being secured to the inside beams of the main frame and connected to the front side portions of the secondary or auxiliary frame by links 17, while the rear springs 16 are secured to the rear side portions of the main frame and are connected to the rear side portions of the said secondary or auxiliary frame by links 18. Thus the rocking frame is spring-supported on the main frame for rocking movements on the intermediate pivot 15.

It will be noted that the engine 19, the fenders 20, the running boards 21, the radiator 22, the gasoline tank 23, and transmission casing 24 are all mounted on and carried directly by the rocking or intermediately pivoted secondary or supplemental frame 14 so that they all partake of the limited oscillatory movements of the main frame. Of course, the steering post 25 and the pedals 26, the gear shaft lever 27, and brake lever 28, also all move with the secondary or supplemental frame 14, and hence with the body of the automobile. The body proper of the automobile is only indicated diagrammatically and in part at 29, on Fig. 3. The engine is connected to the rear transmission of the machine through the customary transmission shaft 30.

Here it is important to note that the intermediate pivot 15 is located forward of the longitudinal center of the machine so that it operates at the center of gravity of the supplemental frame and the load carried thereby.

The above described arrangement, as has been thoroughly demonstrated in practice, produces an automobile in which all shocks due to irregular roads will, in the first place, be reduced at least one-half in intensity by the rocking movements of the body and secondary or supplemental frame on the intermediate pivot 15, at which pivot point the shocks, as is well known, are least felt. In the second place, the shocks will be absorbed through the several primary and secondary springs partly by the rocking action and partly by the springs themselves, so that the combined or resultant action reduces to a minimum shocks due to rough roads. Moreover, the arrangement makes it practically impossible to break springs inasmuch as each spring immediately transmits its shock to some other spring or springs.

In the construction illustrated in Figs. 4, 5 and 6, the numeral 4' indicates the main frame provided with front and rear cantilever springs 5' and 6' attached respectively to the front and rear axle structures 7' and 8'. The numeral 9' indicates the secondary or supplemental frame intermediately pivoted to the main frame at 10' and the numeral 11' indicates cantilever springs applied to the side portion of the main frame 4' and connected to the sides of the supplemental frame 9' by slot and pin connections 12'. In this construction, the automobile body proper, the engine, the fenders and various other parts which will be applied to or carried by the rocking secondary or supplemental frame, are not shown.

What I claim is:

1. In a motor vehicle, the combination with a running gear including front wheels, rear wheels, front axle, rear axle, and main frame supported from said front and rear axles, of a secondary body-supporting frame intermediately pivoted to said main frame, springs connecting the front and rear portions of said supplemental main and secondary frames, and an engine, fenders, and running boards, carried by and movable with said intermediately pivoted secondary frame.

2. The structure defined in claim 1 in which the springs between said main and supplemental frame are of the cantilever type disposed on opposite sides of said frames.

3. The structure defined in claim 1 in further combination with springs supporting the front and rear portions of said main frame from the vehicle running gear.

In testimony whereof I affix my signature.

PETER S. LARSON.